United States Patent [19]

Geiser et al.

[11] Patent Number: 5,323,288
[45] Date of Patent: Jun. 21, 1994

[54] PROTECTION SYSTEM FOR ELECTRIC CIRCUITS

[75] Inventors: Francis Geiser, Yverdon; Sergio Lazzarotto, Marin, both of Switzerland

[73] Assignee: Heinemann Electric (Europe) S.A., Le Lieu, Switzerland

[21] Appl. No.: 865,466

[22] Filed: Apr. 9, 1992

[30] Foreign Application Priority Data

Apr. 15, 1991 [FR] France .................. 9104683

[51] Int. Cl.$^5$ .................. H01H 75/00; H02H 6/00
[52] U.S. Cl. .................. 361/87; 361/93; 361/115
[58] Field of Search ............ 361/93, 99, 87, 115; 335/35

[56] References Cited

U.S. PATENT DOCUMENTS

| | | | |
|---|---|---|---|
| 4,325,041 | 4/1982 | Murai | 335/35 |
| 4,935,715 | 6/1990 | Popeck | 361/115 |
| 5,019,956 | 5/1991 | Nakayama | 361/87 |

FOREIGN PATENT DOCUMENTS

| | | | |
|---|---|---|---|
| 2599195 | 11/1987 | France | H02H 3/00 |
| 2645362 | 10/1990 | France | H02H 3/10 |
| 2226464 | 6/1990 | United Kingdom | H02H 6/00 |

OTHER PUBLICATIONS

French Search Report.

*Primary Examiner*—A. D. Pellinen
*Assistant Examiner*—S. W. Jackson
*Attorney, Agent, or Firm*—Pollock, Vande Sande & Priddy

[57] ABSTRACT

This invention concerns a system for the protection of electric circuits (60, 61, 62) which permits an analysis in real time of the evolution of electric currents circulating in such electric circuits, such analysis having as its purpose not only protection but also prevention. Such protection system comprises at least one circuit breaker (64, 66) including a first coil (70, 71) associated with a magnetic circuit and bearing the main current, as well as a second coil (74, 75) likewise associated with the magnetic circuit. Such second coil carries an induced current representative of the main electric current. Such induced current is processed by an electronic circuit (80) which supplies a processed signal representative of at least one characteristic of the main current, said characteristic being used for prevention in the electric circuits.

16 Claims, 4 Drawing Sheets

PROTECTION SYSTEM FOR ELECTRIC CIRCUITS

TECHNICAL FIELD

This invention relates to a protection system for electric circuits which permits an analysis in real time of the evolution of electric currents circulating in electric circuits by means for measuring such currents, such analysis having prevention as its purpose, such prevention being active or passive.

BACKGROUND OF THE INVENTION

There are known in the state of the art load protection systems having several functions, such systems generally enabling automatic stopping of the current when an abnormal state occurs. For example, it has already been known from the patent application FR 2 645 362 to integrate several functions within a single concept for a protection system enabling active and passive prevention. The arrangement described in this application comprises circuit breakers in a first unit acting on several phases of a principal circuit, such circuit breakers reacting to an overload current, the interruption mechanism being also coupled to an electromagnet permitting interrupt manoeuvres and closing down of the principal circuit. In a second unit, there is provided a current transformer for each of the phases, such transformer serving uniquely for the detection of a current flowing in the phase concerned. Moreover, such system comprises a means for production of signals coupled to the current transformers, automatic or remote controlled triggering means, means for communication with a central microcomputer and display means.

If this system has the advantage of proposing a set of integrated functions within a single arrangement, it is relatively heavy in components. In particular, the short-circuit protection and the stopping function in case of an anomaly in a predetermined parameter of such current require two different triggering mechanisms acting on the same pair of contacts. Next, the measuring function requires several units comprising current transformers which are structurally separated from the circuit breakers. This not only brings about an increase in the cost of construction, but complication during the assembly and a relatively substantial space requirement.

The invention has as its purpose to provide a protection system for at least one electric circuit which is more simple and less costly than that of the prior art cited hereinabove.

SUMMARY OF THE INVENTION

The invention thus has as its objective a protection system for at least one electric circuit feeding at least one load, such system comprising at least one circuit breaker including a magnetic circuit, a first coil associated with said magnetic circuit and connected to said electric circuit so as to carry a principal electric current feeding said load, and means controlled by said first coil in order to open said electric circuit whenever the principal electric current exceeds a predetermined value, such system being characterized in that a second coil is associated with said magnetic circuit so as to permit the generation in such second coil of an induced electric current representative of said principal electric current, this latter coil forming together with said circuit breaker a base element and in that the system also includes processing means connected to said second coil in order to process said induced current so as to furnish a processed signal representative of at least one characteristic of said principal electric current.

Thanks to these characteristics, the protection system according to the invention enables prevention, since it encompasses protection means against an eventual overload as well as means for detecting current circulating in the circuit with which the circuit breaker is associated in a single unit composed of at least one base element having two coils. Furthermore, according to another characteristic of the invention, it is possible to use the second coil serving for measurement to trigger the current interruption mechanism by a control arrangement provided to this end according to the same operating principle as the first coil of the circuit breaker.

The cumulation of three possible functions assured by a magnetic circuit breaker to which there has been added a second coil, preferably concentric and at the interior of the first coil carrying the principal current feeding a load, is particularly interesting. The three functions are:

protection in case of overload or short-circuit,
measurement of the characteristics of the principal current, and
an interruption of the principal current as a function of predetermined criteria other than those which trigger a break in case of overload or short-circuit.

The invention will be better understood with the help of the description to follow and drawings which illustrate it by way of example.

DESCRIPTION OF THE PREFERRED EMBODIMENTS

Figure 1:
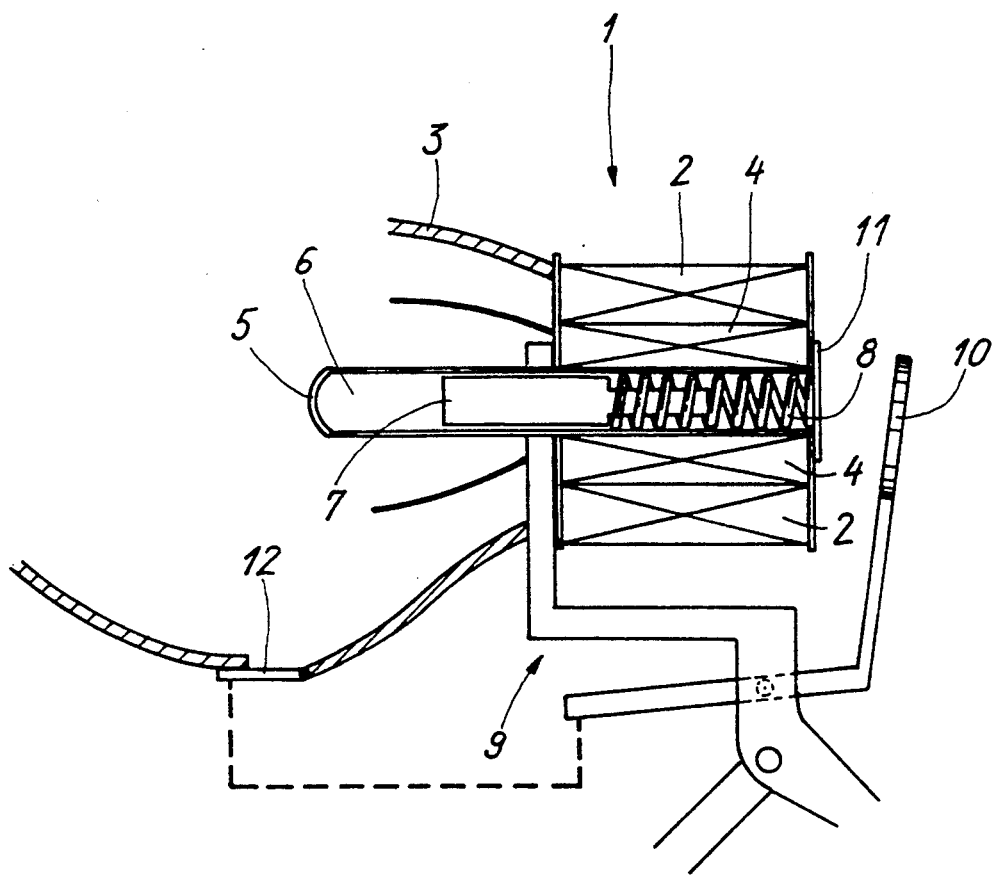
FIG. 1 shows schematically the base element of the system of protection of one of the electric circuits according to the invention.

Referring to FIG. 1, there will be described hereinafter solely by way of example a base element of the proposed protection system.

Such base element comprises a hydro-magnetic circuit breaker 1 comprising a first coil 2 in which circulates the current of the electric circuit 3 with which the circuit breaker is associated, such coil being wound over a second coaxial coil 4, an induced current being able to circulate in such second coil following variations of the magnetic field produced by the first coil 2.

Such second coil 4 is wound on a non-magnetic sealed tube 5 filled with a silicone liquid 6 in which is slidingly mounted a movable iron core 7 urged by a return spring 8 towards a position in which it is placed outside coils 2 and 4. Triggering of such hydro-magnetic circuit breaker is brought about by variation of the magnetic flux within the tube in which is located the movable iron core.

The circuit breaker likewise comprises a magnetic circuit 9 in which a movable armature 10 and a pole piece 11 form a part, the armature being coupled to a contact 12 inserted in the electric circuit 3 of coil 2 through a mechanical connection (not shown).

In another embodiment of such base element, the second coil 4 is located beside the first coil 2, both coils 2 and 4 being associated with the same magnetic circuit 9.

When the intensity of the magnetic flux increases, thus drawing core 7 to the interior of coils 2 and 4 towards the armature 10, there results therefrom a reduction of the reluctance and a supplementary increase of the intensity of the magnetic field. The silicone liquid smoothes the speed of displacement of core 7, thus creating a predetermined delay time the duration of which is inversely proportional to the intensity of the magnetic flux.

When such magnetic flux attains a predetermined intensity, armature 10 is drawn towards the pole piece 11 and contact 12 of the circuit breaker opens. In the case of strong currents, the magnetic field generated by one or the other of the two coils 2 and 4 is sufficient to bring about an instantaneous triggering, the position of the core 7 then having no longer any effect.

Figure 2:
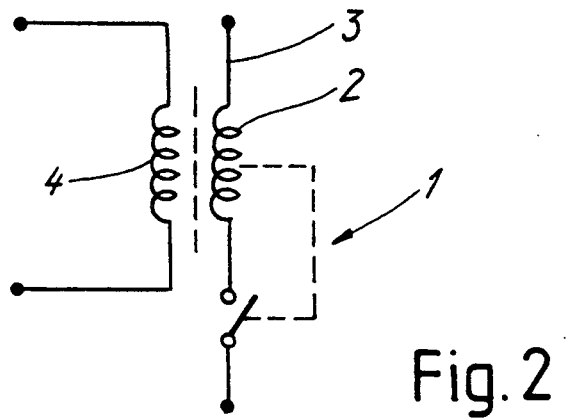
FIG. 2 represents the electrical schematic corresponding to the base element of FIG. 1.

FIG. 2 shows an electrical schematic equivalent to the base element described in FIG. 1.

In referring to FIG. 3, there will be described a first embodiment of the protection system for electric circuits according to the invention.

The protection system conforming to this embodiment is applied to three electric circuits 21, 22, 23 adapted to feed one or several loads 24. In each of such electric circuits is inserted a respective base element 26, 28, 30 such as described hereinbefore.

Furthermore, each of such base elements is provided with a mechanical means respectively 32a, 32b, 32c in order to close or open the contact 12 of at least one circuit breaker. However, nothing prevents providing electrical means for controlling the resetting of the circuit breaker or indeed as means for opening and closing the electric circuits.

Each of the second coils, respectively 34, 36, 38 (that is to say, coils 4 of the base elements according to FIG. 1) is electrically coupled to an electronic channel selection circuit 40 thus permitting the selection of one of the electric circuits in which the user wishes to make a measurement. Consequently, by the word "channel" here there is to be understood one of the electric circuits in which are respectively inserted windings 34, 36 and 38.

The electronic channel selection circuit 40 is coupled to a digital channel selection circuit 42 which controls it. Functionally, the circuit may comprise a bipolar switch having several positions (as symbolized on FIG. 3), the control of which is assured by the selection circuit 42, such switch naturally being able to assume an electronic form by means of switching transistors for instance. The selection circuit may be equipped with an indicator 42a of the channel connected for the measurement. The circuit 42 may be manually controlled or automatically controlled according to a predetermined selection program.

In addition, circuits 40 and 42 are galvanically insulated from one another by means of an optocoupler 44.

The electronic channel selection circuit 40 is connected to another processing circuit 46 for the current induced in coil 34, 36 or 38. Such induced current processing circuit 46 comprises an amplifier 46a, a filter 46b and impedance matching means 46c.

Such processing circuit 46 thus enables furnishing a processed signal giving an image of the current circulating in the channel with which the second coil 34, 36 or 38, as selected for measurement, is associated.

The induced current processing circuit 46 itself is coupled to a receiving unit 48 for the processed signal, such receiving unit being capable of interpreting such signal and giving thus the value of one or several predetermined parameters. It will be noted that there has also been provided an optocoupler 50 in order to insulate galvanically circuit 46 from the receiving unit 48.

By way of example, circuit 48 may be equipped with an ammeter 48a or a curve tracer or indeed a visual indicator 48b providing the user with information on the evolution of the current induced in coils 34, 36 or 38 and thus of the current circulating in circuits 21, 22 and 23. The visual indicator may be triggered for instance by the crossing of a predetermined threshold by the current measured.

The channel selection circuit 42 as well as the induced current processing circuit 46 are coupled to a feeding circuit 51 comprising for instance a transformer lowering the voltage from 220V to 15V, the primary of which is coupled to ground or to the neutral phase and to one of the electric circuits 21 above the load 24. The set of elements located within rectangle I forms a set of compact modules as shown schematically by FIG. 4.

This first embodiment thus describes a protection system for electric circuits with passive prevention. The first coil, respectively 26, 28, 30 of each base element in which the current, respectively of circuit 21, 22, 23 with which such base element is associated circulates, assures a protection against an eventual overload or against a short-circuit. The second coil respectively 34, 36 and 38 serves solely as a means of detecting current circulating in the associated electric circuit respectively 21, 22 and 23, such detection signal permitting the induced current processing circuit 46 to provide a processed signal which may be correctly interpreted by the receiving unit 48 for such processed signal, which it translates in turn into a real measurement value. Within the present context, there is understood by "passive prevention" the fact that the operator, in observing the receiving unit 48, may react at any instant to interrupt feeding of the loads 24 if he judges that the information on the evolution of currents provided by such unit indicates abnormal operation.

Figure 4:
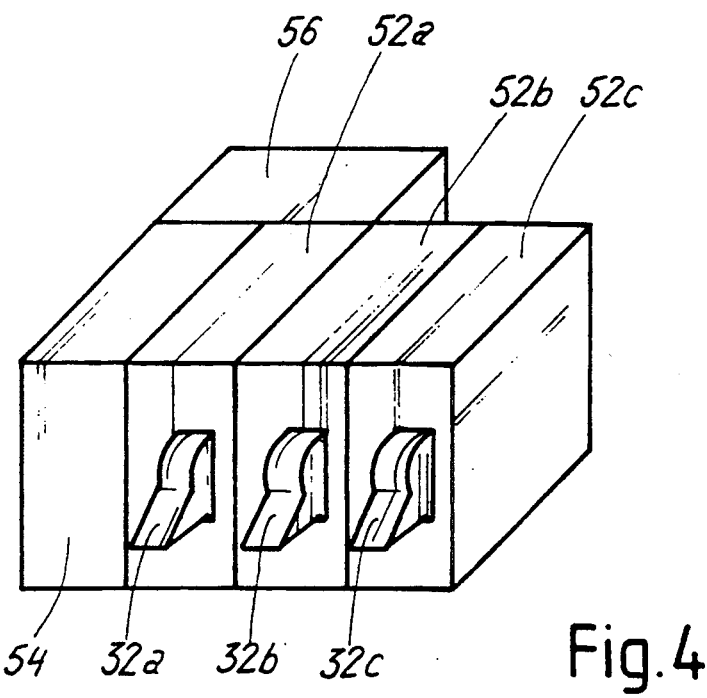
FIG. 4 shows a modular spatial arrangement of the device located within rectangle I of FIG. 3.
Figure 3:
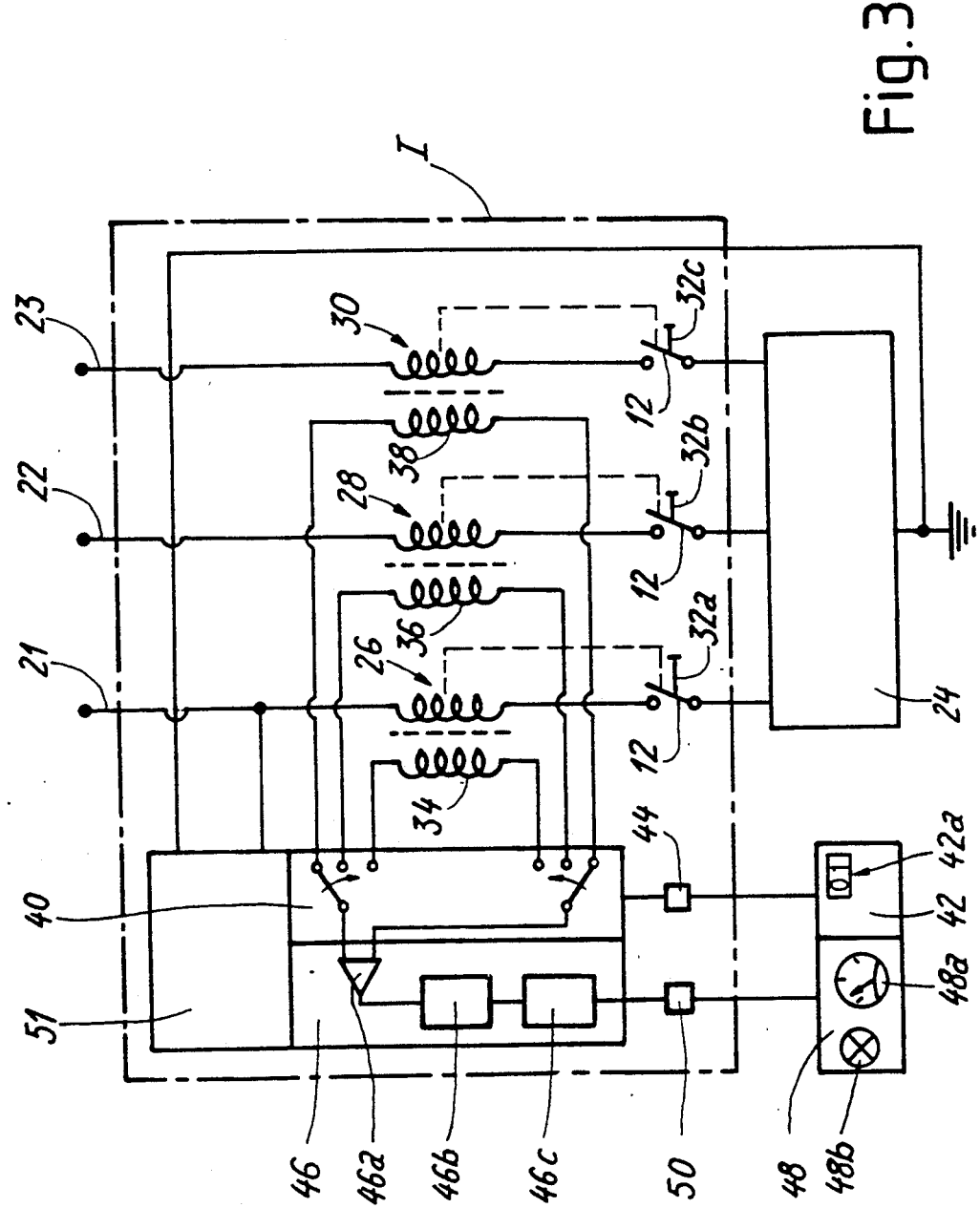
FIG. 3 shows schematically a first embodiment of the protection system for electric circuits according to the invention.

FIG. 4 shows in a very schematic manner a possible spatial arrangement of the system located within rectangle I of FIG. 3.

Such system thus essentially comprises five modules, three of such modules 52a, 52b, 52c housing at least one base element constituted by the magnetic circuit breaker 1 and the second measurement coil 4 which is associated therewith. A fourth module 54 having a substantially similar form houses the channel selection circuit 40 and the induced current processing circuit 46. The feeding circuit 51 for circuits 40 and 46 is situated in a fifth module 56 located behind.

It is to be noted that the assembly shown on FIG. 4 integrates all necessary functions for practising the invention. A user need only join the connections of the principal circuits 21, 22 and 23 as well as those coupled to the circuits 42 and 48.

Figure 5:
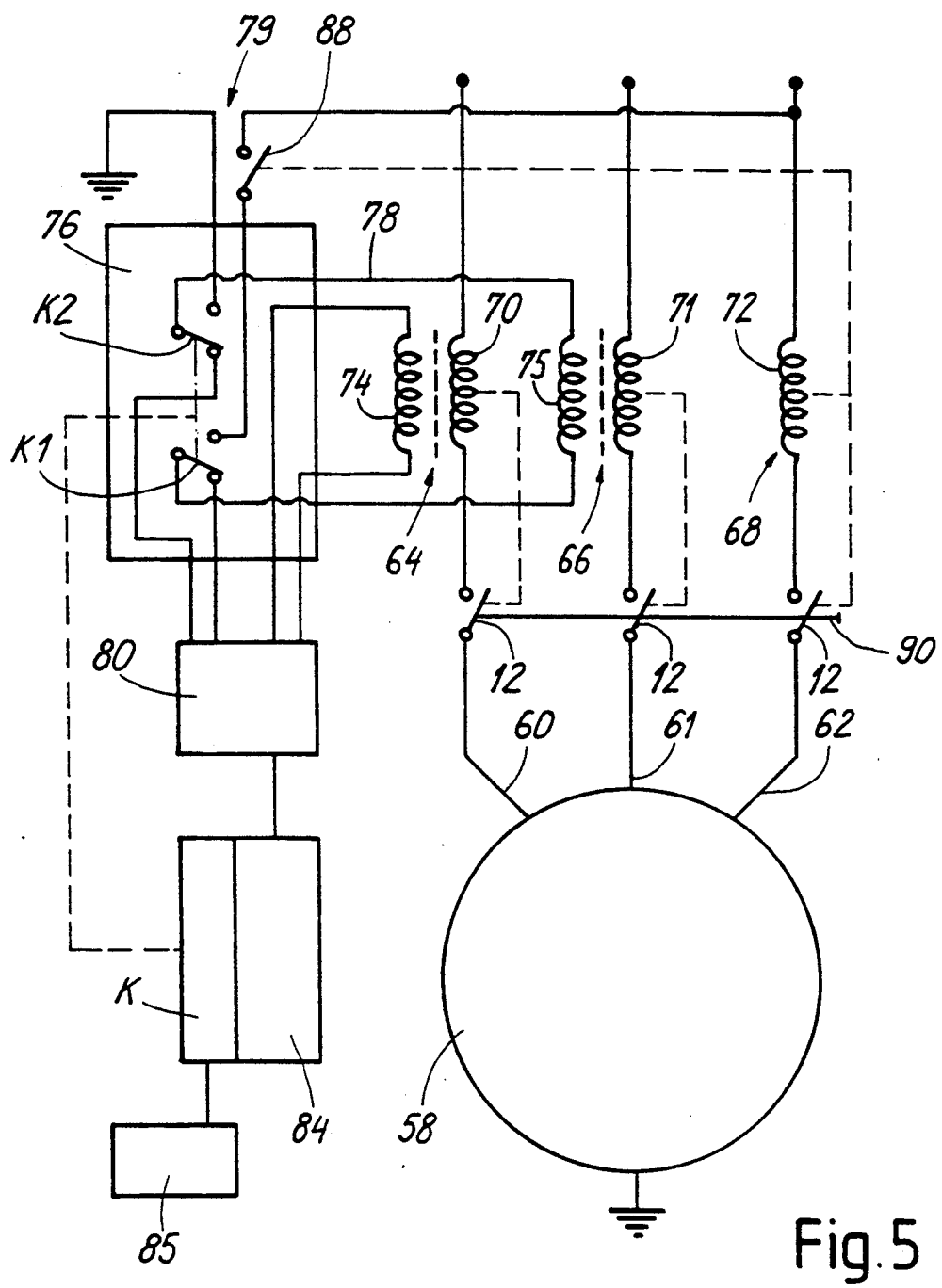
FIG. 5 shows schematically another embodiment of the protection system for electric circuits according to the invention.

Referring now to FIG. 5, there will be described hereinafter a second embodiment of the protection system for electric circuits according to the invention. This embodiment is applied to a three-phase motor 58 with a protection system permitting active prevention for the circuits feeding such motor, each phase defining an electric circuit respectively 60, 61 and 62. In two of such electric circuits 60 and 61 there is provided a base element respectively 64 and 66 while in the third circuit 62 there is provided a conventional circuit breaker 68. The two base elements and the circuit breaker each have a first coil respectively 70, 71, 72 serving as triggering means for the interruption mechanism, the triggering occurring when the electric currents circulating in the corresponding circuit exceed a certain value.

The two base elements comprise in addition a second coil respectively 74, 75 coaxial and in the interior having a double function, namely a first function for detecting current circulating in the first coil and a second function as means of triggering the interruption mechanism of the circuit breaker, the triggering being controlled by an arrangement provided to this effect and described hereinafter.

Such two coils 74 and 75 are coupled to a switching arrangement 76 comprising inverters K1 and K2 and a control coil K for this switching arrangement which is arranged to switch channel 78 associated with coil 75, either to a voltage source 79, or onto a circuit 80 for processing induced current (analogous to circuit 46 of FIG. 3) in order to obtain a processed signal. This latter is coupled to an active prevention circuit 84 intended to analyze such measurement signals and to make interruption decisions by comparison with predetermined parameters which are memorized therein in an electrical form.

The control coil K may also be remotely energized with the help of a control element 85 which enables action on the switching arrangement 76 without the automatic intervention of the active prevention circuit 84.

The switching arrangement 76 may take the form of an electro-mechanical relay or an electronic switching circuit.

The prevention circuit 84 is available in commerce under the designation DMPR manufactured by the Company MTE Ltd, Stephenson Road, Leigh-on-Sea, SS q. 5. LS (Essex), England. Nevertheless, circuits 80 and 84 of FIG. 5 are advantageously embodied in a single common circuit by adaptation of the concept of the circuit DMPR as mentioned hereinabove. In order to diminish to the greatest extent the space requirement of the electronic circuits employed, it is foreseen to assemble the various electronic components by means of surface mounting technology.

The voltage source 79 is advantageously formed by the one of the phases feeding motor 58 in which the circuit breaker 68 lacks the second coil and through ground or the neutral, an interruption contact 88 being provided so as to be mechanically coupled to contact 12 of the circuit breaker 68 in order to interrupt the feeding of channel 78 associated with coil 75 when motor 58 is cut off from its feeding.

The operation of the system of FIG. 5 is the following:

When an overload or a short-circuit occurs in one of the principal circuits, the base element respectively 64, 65 or the circuit breaker 68 fulfils its role through the intervention of coil 70, 71 or 72 thus bringing about the opening of the three circuits feeding load 58.

However, the cut-off may also be obtained by having a current circulate in the second coil 75 of the base element 66 capable of drawing the armature of such element and opening contacts 12.

In order to obtain this, the active prevention circuit 84 receives the currents induced in the second coils 74 and 75 and compares the parameters of such currents to the predetermined parameters and to the limit values programmed in this circuit. As soon as the results of the measurements exceed the tolerated limit values, the active prevention circuit 84 energizes the control coil K of the switching arrangement 76 in order to switch coil 75 onto the voltage source 79. This then brings about triggering of the three circuits, assuming that the interruption mechanisms of the two base elements 64, 66 and of the circuit breaker 68 are mechanically coupled by an appropriate mechanism 90.

It is thus seen that the system according to the invention which has just been described enables obtaining a cut-off of the load, not only following an overload or a short-circuit, but also following the exceeding of certain energization characteristics of such load for which the limit values have previously been fixed within the prevention circuit 84.

It will be further noted that it is entirely possible to introduce into the embodiment of FIG. 5 a channel selection circuit 40 coupled to a digital channel selection circuit 42 equivalent to that described in FIG. 3. In this latter case, the induced current processing means 80 receives only a single induced current at a given instant corresponding to the current induced in the channel selected for measurement. In the case of preventive stops, the voltage source 79 then provides a triggering current to the second coil associated with the selected channel.

Finally, it is also possible to introduce in the embodiment of FIG. 3, in a manner equivalent to that of FIG. 5, a switching arrangement 76 coupled on the one hand to a control coil K and on the other hand to a voltage source 79 in order to be able to open one or several circuit breakers by means of a control element 85 permitting a remote interrupt control of one or several electric currents.

What is claimed is:

1. A protection system for at least one electric circuit feeding at least one load, said protection system comprising circuit breaker means for opening said electric circuit, said circuit breaker means comprising;

a magnetic circuit, a first coil associated with said magnetic circuit and connected electrically to said electric circuit so as to carry a principal electric current feeding said load, and interruption means magnetically activable by said first coil for opening said electric circuit whenever the principal electric current exceeds a predetermined value;

and said protection system further comprising;

a second coil associated with said magnetic circuit and forming together with said circuit breaker means a base element, and feeding means electrically connectable to said second coil for providing said second coil with an intervention electric current to activate magnetically said interruption means.

2. A system as set forth in claim 1 wherein said second coil is situated in the interior of said first coil and coaxial thereto.

3. A system as set forth in claim 1 wherein said base element takes the form of a first module and wherein said processing means likewise take the form of a second compact module adapted for assembly with said first module.

4. A system as set forth in claim 1 wherein said processing means comprise amplifying means connected to said second coil, filtering means connected to the output of said amplifying means and impedance matching means at the output of which the processed signal appears.

5. A system as set forth in claim 1 wherein said electric circuit is of the three-phase type and comprises another of said circuit breaker means associated with one of the three phases, and wherein said system further comprises another of said base elements and each of the two other phases contains a corresponding one of said base elements for assuring measurement of said principal electric current.

6. A system as set forth in claim 5 wherein the interruption means of said another circuit breaker means is mechanically coupled to the interruption means of the circuit breaker means of at least one of said base elements.

7. A system as set forth in claim 6 wherein the second coil of only one of said base elements is coupled to said switching means, and wherein the interruption means of the circuit breaker means corresponding to said coupled second coil is mechanically coupled to the interruption means of the other circuit breaker means so as to bring about interruption of the principal electric current flowing in each of the electric circuits in the case of anomalies other than an overload or a short circuit.

8. A system as set forth in claim 1 further comprising processing means electrically connectable to said second coil for processing a current induced in said second coil by said principal electric current to provide a processed signal representative of at least one characteristic of said principal electric current.

9. A system as set forth in claim 8 for at least two of said electric circuits, said system comprising a base element associated with each of the electric circuits and having a second coil for assuring measurement of the principal electric current flowing in the corresponding electric circuit, and selection means situated between said second coil of each of said base elements and said processing means in order to couple selectively said processing means to one or the other of said second coils with the help of a selection circuit.

10. A system as set forth in claim 8 wherein said feeding means is formed by a voltage source and wherein said system further comprises switching means coupled, on the one hand, to said voltage source and, on the other hand, to said processing means to connect selectively said second coil either to said processing means so as to furnish said induced current thereto or to said voltage source in order to generate said intervention electric current in said second coil.

11. A system as set forth in claim 10 which is for at least three electric circuits and further comprises another circuit breaker means in one of the three electric circuits and another of said base elements, a corresponding one of said base elements being associated with each of the two other electric circuits, and the second coil of each of said base elements being arranged for assuring measurement of the principal electric current flowing in the corresponding electric circuit.

12. A system as set forth in claim 11 wherein the second coil of only one of said base elements is coupled to said switching means, and wherein the interruption means of the circuit breaker means corresponding to said coupled second coil is mechanically coupled to the interruption means of the other two circuit breaker means so as to bring about interruption of the principal electric current flowing in each of the electric circuits in the case of anomalies other than an overload or a short circuit.

13. A system as set forth in claim 11 comprising a receiving unit for said signal representative of the measured principal current, said receiving unit being adapted to display the real values of at least one parameter of such principal current.

14. A system as set forth in claim 10 for at least two of said electric circuits, said system further comprising;
   another of said base elements, a corresponding one of said base elements being associated with each of the electric circuits and the second coil of each of said base elements being arranged for assuring measurement of the principal current flowing in the corresponding electric circuit,
   and selection means situated between said coil of each of said base elements and said processing means in order to couple selectively said processing means to one or the other of said second coils with the help of a selection circuit.

15. A system as set forth in claim 10 comprising an active prevention circuit intended to resolve said processed signal, coming from said processing means, from said current induced in said second coil and to compare such processed signal with predetermined parameter values memorized in said active prevention circuit, the system also comprising control means responsive to the result of such comparison for controlling said switching means to connect said second coil to said voltage source whenever said comparison reveals an anomalous state.

16. A system as set forth in claim 15 wherein said control means for said switching means is coupled to a remote control unit intended to activate said control means as a function of parameters other than those memorized in said active prevention circuit.

* * * * *